United States Patent
Kim

(10) Patent No.: US 6,523,571 B1
(45) Date of Patent: Feb. 25, 2003

(54) VALVE APPARATUS FOR HERMETIC COMPRESSOR

(75) Inventor: Saeng-Ho Kim, Inchon (KR)

(73) Assignee: Samsung Kwangju Electronics Co., Ltd. (KR)

( * ) Notice: Subject to any disclaimer, the term of this patent is extended or adjusted under 35 U.S.C. 154(b) by 0 days.

(21) Appl. No.: 09/599,886

(22) Filed: Jun. 23, 2000

(30) Foreign Application Priority Data

Jun. 24, 1999 (KR) .............................. 99-24104

(51) Int. Cl.⁷ .............................................. F16K 15/14
(52) U.S. Cl. ...................................... 137/856; 137/855
(58) Field of Search ............................... 137/855, 856; 417/569, 571

(56) References Cited

U.S. PATENT DOCUMENTS 4,180,042 A  * 12/1979  Lloyd ........................... 137/856
5,010,918 A  * 4/1991   Tolsma ......................... 137/856
5,379,799 A  * 1/1995   Kawai et al. .................. 137/856
5,647,395 A  * 7/1997   Hasimoto et al. .............. 137/856

* cited by examiner

Primary Examiner—Michael Powell-Buiz
Assistant Examiner—Ramesh Krishnamurthy
(74) Attorney, Agent, or Firm—Burns Doane Swecker & Mathis, LLP

(57) ABSTRACT

A hermetic compressor includes a compressing chamber and a valve plate forming suction and discharge ports communicating with the chamber. A discharge valve has one end fixed to the valve plae and a free end that is flexible to open and close the discharge port. A discharge backer has one end fixed to the valve plate and is positioned to limit the opening movement of the discharge valve. The discharge backer includes integral protrusions projecting toward the discharge valve. One of the projections is in constant contact with the discharge valve and forms a fulcrum therefor.

3 Claims, 3 Drawing Sheets

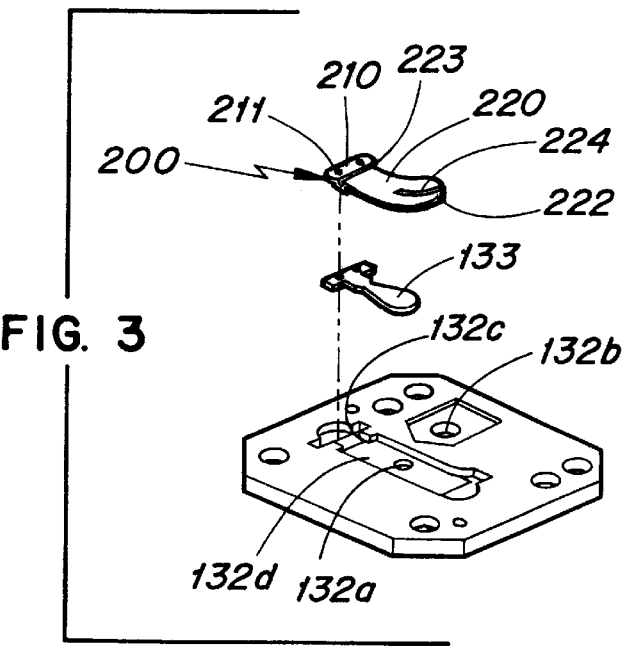
FIG. 3
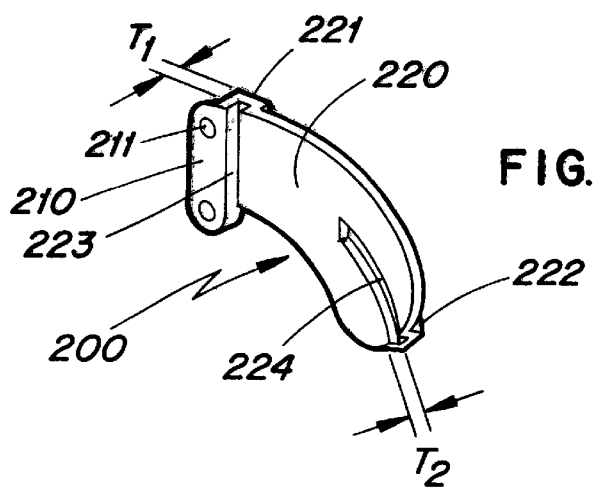
FIG. 4
FIG. 5a
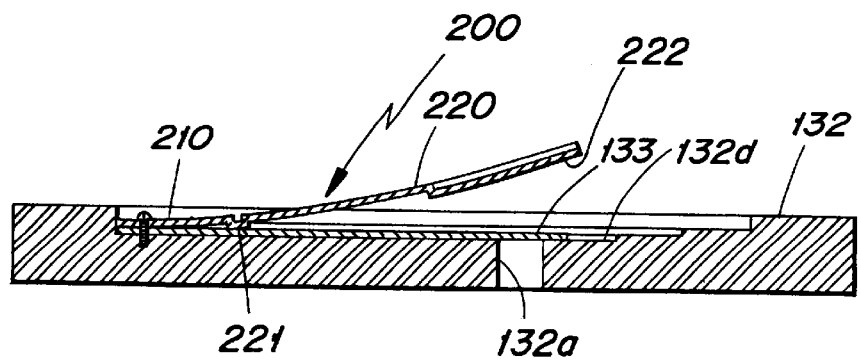

VALVE APPARATUS FOR HERMETIC COMPRESSOR

BACKGROUND OF THE INVENTION

1. Field of the Invention

The present invention relates to a hermetic compressor, more particularly, a valve apparatus for a hermetic compressor, which drives facilely a refrigerant discharge valve so as to improve a refrigerant discharge efficiency.

2. Description of the Related Art

Generally, there are various kinds of hermetic compressors such as a reciprocating compressor, a linear compressor and a rotary compressor. Most compressors are provided with a valve apparatus which controls an entrance of a refrigerant into a compressing chamber.

As shown in FIG. 6, a valve apparatus of the conventional reciprocating compressor comprises a cylinder head 11 which is coupled to a side of a cylinder block (not shown) of the compressor, and a valve plate 12 which is interposed between the cylinder head 11 and the cylinder block. A discharge valve 13 and a discharge backer 14 are riveted to the valve plate 12.

Here, the discharge backer 14 is curved from a fixed end riveted to the valve plate 12 toward a free end thereof, i.e., the cylinder head 11. This prevents the discharge valve 13 from having an unnecessary operating width, when the discharge valve 13 is operated, so that the discharge valve 13 properly performs an open-and-shut action.

However, in the conventional discharge backer 14, since a surface, which is contacted wish the discharge valve 13, is formed into a plane, an oil film is formed on the surface of the discharge backer 14 by oil which is discharged together with refrigerant gas during the open-and-shut action of the discharge valve 13. Frequently, the discharge valve 13 to be contacted with the discharge backer 14 is closely contacted with the surface of the discharge backer 14 due to an oil viscosity. Therefore, there is a problem that the discharge valve 13 can not secure its own equal driving property. As disclosed above, if the discharge valve 13 can not show the equal driving property, a part of the discharged refrigerant flows backward into a compressing chamber during a suction stroke by the delay of a returning action of the discharge valve 13. Therefore, there is other problem that a compressing efficiency of the refrigerant is lowered.

SUMMARY OF THE INVENTION

It is therefore an object of the present invention to improve the discharge backer which restricts and supports the operating width of the discharge valve so as to secure the equal and stable driving property of the discharge valve, thereby improving the compressing efficiency of the refrigerant.

To achieve the above objects and other advantages, there is provided an valve apparatus of a hermetic compressor, comprising a cylinder block in which a compressing chamber is formed; a valve plate which is disposed between the cylinder block and the a cylinder head coupled to a side of the cylinder block, and which is formed with a suction port and a discharge port; a discharge valve of which one end is fixed to the valve plate and the other end opens/closes the discharge port; and a discharge backer which is outwardly curved from its clamping end toward its free end so as to restrict an operating width of the discharge valve, characterized in that the discharge backer is provided with a protrusion which is projected toward the discharge backer so as to prevent the discharge valve from being closely contacted with the discharge backer.

BRIEF DESCRIPTION OF THE DRAWINGS

The above object and other advantages of the present invention will become more apparent by describing in detail the preferred embodiments thereof with reference to the accompanying drawings, in which:

FIG. 3 is an exploded perspective view of a part of the valve apparatus according to the present invention;

FIG. 4 is an enlarged perspective view of a discharge backer according to the present invention;

FIG. 5a is a view showing a state of the valve apparatus prior to discharging of refrigerant;

DETAILED DESCRIPTION OF THE PREFERRED EMBODIMENTS

The present invention now will be described more fully hereinafter with reference to the accompanying drawings, in which preferred embodiments of the invention are shown.

Figure 1:
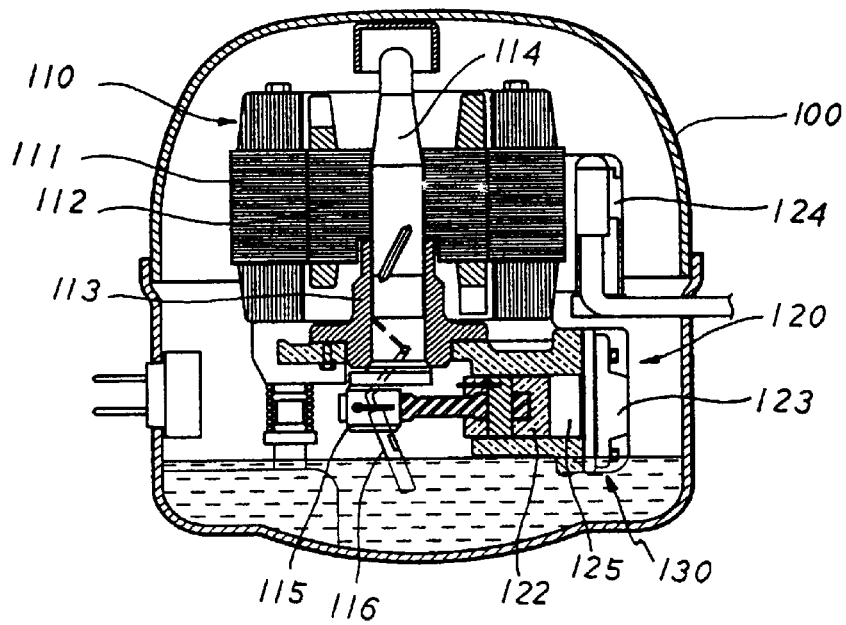
FIG. 1 is a cross-sectional view of a hermetic compressor with a valve apparatus according to the present invention.

As shown in FIG. 1, a hermetic compressor with a valve apparatus according to the present invention is provided with a sealed housing 100 which has a sealed space therein. In the sealed housing 100, there are disposed a driving portion 110 and a compressing portion 120.

The driving portion 110 comprises a stator 111 which receives an electric current from the outside and forms a magnetic field, and a rotor 112 which is disposed at an inner side of the stator 111 and rotated by an electromagnetic force with the stator 111 and supported by a supporting bearing 113. And at a center portion of the rotor 112, there is mounted a rotational shaft 114. A lower part of the rotational shaft 114 forms an eccentric shaft 115 which is biased against a rotational center of the rotational shaft 114. At a lower end of the eccentric shaft 115, there is mounted an oil pickup device 116 for picking up oil stored at a lower portion of the sealed housing 100.

The compressing portion 120 supports the above construction elements of the driving portions, and comprises a cylinder block 121 which has a compressing chamber 125 therein and a piston 122 which is mounted in the compressing chamber in a vertical direction with respect to the eccentric shift 115 so as to perform a reciprocal rectilinear motion. A cylinder head 123 is mounted at a side of the compressing chamber 125. Between the cylinder block 121 and the cylinder head 123, there is disposed a valve apparatus 130 comprising a plurality of construction elements. A suction muffler 124 is disposed at an upper portion of the cylinder head 123.

Figure 2:
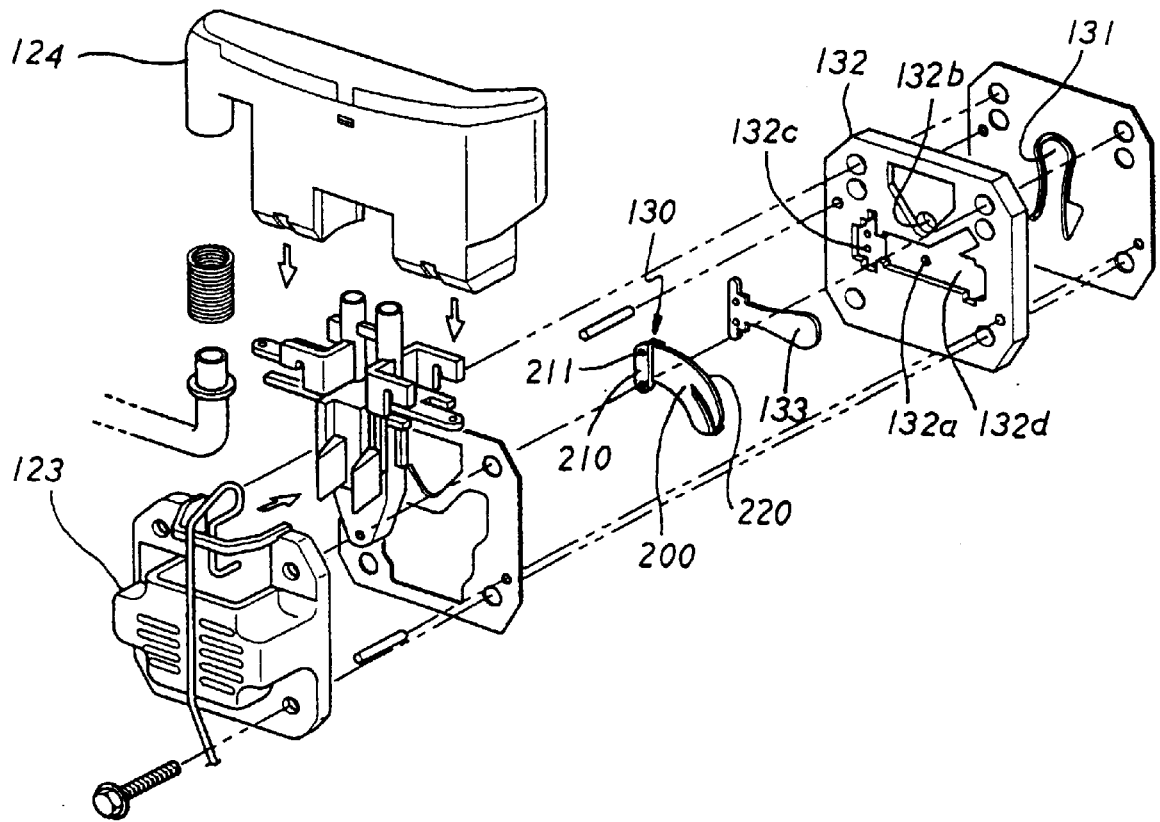
FIG. 2 is an exploded perspective view of the valve apparatus according to the present invention.

Meanwhile, as shown in FIGS. 2 and 3, the valve apparatus 130 comprises a suction valve 131 which is adjacent to the cylinder block 121 and a valve plate 132 which is formed with a suction port 132b and a discharge port 132a. A discharge valve 133 is mounted on an outer side of the valve plate 132. A discharge backer 200 is riveted along with the discharge valve 133. At an outer face of the valve plate 132, there is formed a mounting groove 132d for mounting the discharge valve 133 and the discharge backer 200. Further, there are provided a plurality of gaskets 138 among the construction elements of the valve apparatus 130.

Here, as shown in FIG. 4, the discharge backer 200 is formed with a clamping portion 210 having two holes 211 through which rivets are respectively inserted, and a supporting portion 220 which is extended from the clamping portion 210 so as to support an operating part of the discharge valve 133. The supporting portion 220 is curved from the clamping portion 210 toward the cylinder head 123. The curved width(W: a space between a free end of the supporting portion 220 and a surface of the valve plate 132, FIG. 5b) is about 0.6~1.2 mm. Further, the supporting portion 220 of the discharge backer (200) is formed with two protrusions 221, 222 which prevent the discharge valve 133 from being closely contacted with a bottom face of the discharge backer 200 by an oil viscosity.

The protrusions 221, 222 are a first protrusion 221 which is formed to be adjacent to the clamping portion 210 and is projected in a thickness ($T_1$) of 0.1~0.3 mm toward the discharge valve 133, and a second protrusion 222 which is projected in a thickness ($T_2$) of 0.1~0.5 mm from the bottom face of the discharge backer 200 toward the discharge valve 133 and extended from a center of the free end of the supporting portion 220 to a portion which is below the half length of the supporting portion 220. Further, at each opposite side of the first and second protrusions 221, 222, there are respectively formed a first recess 223 and a second recess 224 corresponding to the first and second protrusions 221, 222.

In addition, the supporting portion 220 of the discharge backer 200 is bent at an angle with the second protrusion 222 in the center so as to schematically form a V-shape. This also prevents the discharge valve 133 from being closely contacted with the discharge backer 200.

Hereinafter, the operating state of the hermetic compressor according to the present invention will be disclosed more fully.

According to the hermetic compressor according to the present invention, if an electric current is applied from the outside to the stator 111, the rotor 112 is rotated by an interaction due to the electromagnetic force between the stator 111 and the rotor 112. The rotational shaft and the eccentric shaft 115 are rotated by the rotation of the rotor 112. And due to the rotation of the eccentric shaft 115, the piston 122 is linearly reciprocated within the compressing chamber 125 so that the refrigerant is sucked and discharged.

At this time, during the suction stroke, the piston 122 is moved to a bottom dead point in the compressing chamber 125. Therefore, a pressure in the compressing chamber 125 is lowered. The suction valve 131 is opened so that the refrigerant passed through the suction muffler 124 is introduced into the compressing chamber 125. In this situation, the discharge valve 133 is sealingly contacted to the discharge port 132a, as shown in FIG. 5a.

Figure 5B:
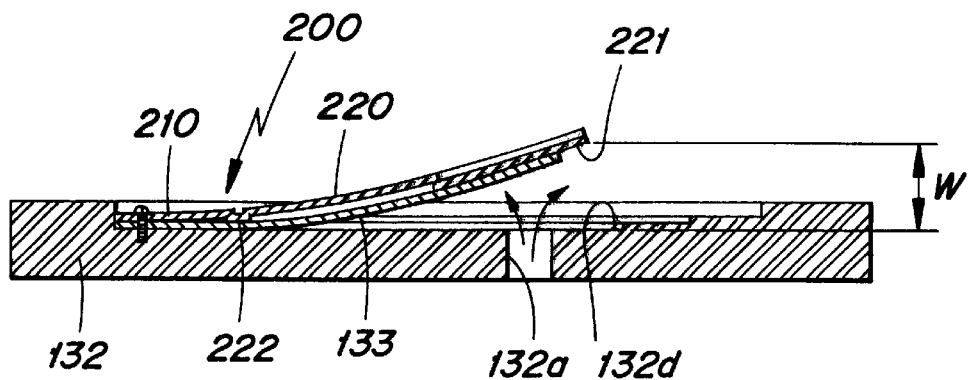
FIG. 5b is a view showing a state of the valve apparatus in which the refrigerant is discharged.
Figure 6:
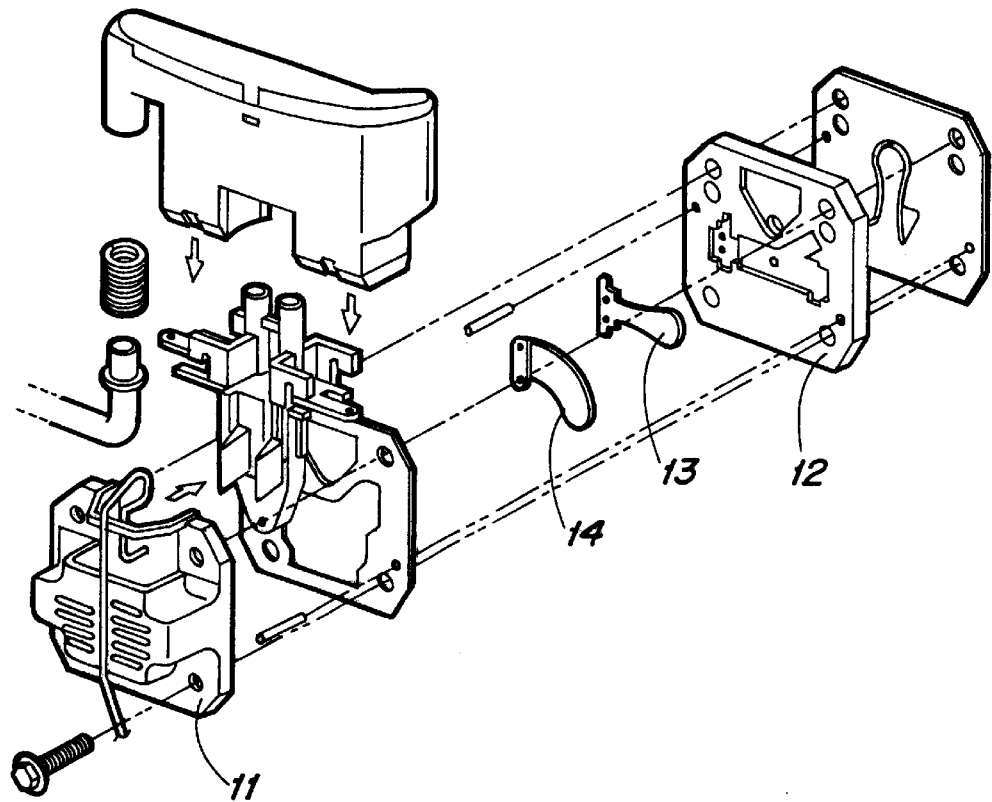
FIG. 6 is an exploded perspective view of a valve apparatus in a conventional hermetic compressor.

And during the exhaust stroke, the discharge valve 133 is pushed away by a pressure of the refrigerant compressed to the side of the discharge backer 200, as shown in FIG. 5b. At this time, the discharge valve 133 which opens the discharge port 132a is moved to the bottom face of the discharge backer 200 so that the operating width of the discharge valve 133 is restricted. Further, the discharge valve 133 is prevented from making close contact with discharge backer 200 by the first and second protrusions 221, 222. As is apparent from FIGS. 5a and 5b, the inner protrusion 221 is in constant contact with the discharge valve in both the open position (FIG. 5b) and the closed position (FIG. 5a) and forms a fulcrum therefor.

Further, since the supporting portion 220 of the discharge backer 200 is formed into the almost V-shape, the edge portion of the discharge valve except for the contacted portion with the second protrusion 222 is hardly contacted with the discharge backer 200, thereby minimizing the contact surface between the discharge valve 133 and the discharge backer 200.

If the discharge operating of the refrigerant is completed by the compressor, the discharge valve 133 is returned to the discharge port 132a by a restoring force and a suction due to a pressure reduction in the compressing chamber 125 so as to close the discharge port 132a. Then, the suction, compression and exhaust stokes are continuously repeated.

In the discharge valve of the hermetic compressor according to the present invention, as described above, the plurality of protrusions are provided on the contacting face of the discharge backer which restricts the operating width of the discharge valve so as to minimize the contacting surface between the discharge backer and the discharge valve, thereby preventing the discharge valve from being closely contacted with the discharge backer by the oil viscosity, and preventing the unequal operating of the discharge valve. Ultimately, the compressing efficiency of the compressor is improved.

It will be apparent to those skilled in the art that various modifications and variations of the present invention can be made without departing from the spirit or scope of the invention. Thus, it is intended that the present invention cover the modifications and variations of this invention provided they come within the scope of the appended claims and their equivalents.

What is claimed is:

1. A valve apparatus of a hermetic compressor, comprising: a cylinder block in which a compressing chamber is formed; a valve plate which is disposed between a cylinder block and the cylinder head coupled to a side of the cylinder block, the valve plate formed with a suction port and a discharge port; a discharge valve of which one end is fixed to the valve plate and the other end constitutes a free end arranged to open and close the discharge port in open and closed positions, respectively, of the discharge valve; and a discharge backer which is outwardly curved from a clamping end thereof toward its free end to restrict an operating width of the discharge valve, characterized in that the discharge backer is provided with a rigid protrusion structure formed as an integral part of the discharge backer and projecting toward the discharge valve to prevent the discharge valve from being closely contacted with the discharge backer, wherein a portion of the protrusion structure is in constant contact with the discharge valve in both the open and closed positions thereof and forms a fulcrum for the discharge valve, the valve plate configured wherein the free end thereof contacts the discharge backer when the discharge valve is in its open position.

2. The valve apparatus according to claim 1, wherein the protrusion comprises a first protrusion which is adjacent to the clamping end of the discharge backer and is projects toward the discharge valve, the protrusion structure further comprising a second protrusion which is adjacent to the free end of the discharge backer and projects toward the discharge valve.

3. The valve apparatus according to claim 2, wherein the first protrusion has a projecting thickness of 0.1~0.3 mm, and the second protrusion has a projecting thickness of 0.1~0.5 mm.

\* \* \* \* \*